United States Patent [19]

Sisk, Jr.

[11] 3,890,799

[45] June 24, 1975

[54] BIMETAL THERMOSTAT DEFROST AND AIR TEMPERATURE CONTROL

[75] Inventor: George William Sisk, Jr., Evansville, Ind.

[73] Assignee: Whirlpool Corporation, Benton Harbor, Mich.

[22] Filed: Mar. 8, 1974

[21] Appl. No.: 449,283

[52] U.S. Cl. ............. 62/215; 62/227; 62/262
[51] Int. Cl. ................................. F25b 1/00
[58] Field of Search ............ 62/180, 202, 203, 209, 62/214, 215, 227, 229, 262

[56] References Cited
UNITED STATES PATENTS

| 2,419,377 | 4/1947 | Shaw | 62/214 |
| 3,492,833 | 2/1970 | Marsteller | 62/209 |
| 3,785,166 | 1/1974 | Schrader | 62/262 |

Primary Examiner—Meyer Perlin
Attorney, Agent, or Firm—Wegner, Stellman, McCord, Wiles & Wood

[57] ABSTRACT

In a refrigeration apparatus for cooling air, a bimetal thermostat responsive to the frost condition of an evaporator structure of the refrigeration apparatus and to the temperature of the air. A thermal conducting means is disposed in heat transfer relationship with the evaporator structure and the bimetal actuating element of the thermostat.

16 Claims, 4 Drawing Figures

PATENTED JUN 24 1975 3,890,799

BIMETAL THERMOSTAT DEFROST AND AIR TEMPERATURE CONTROL

BACKGROUND OF THE INVENTION

1. Field of the Invention

This invention relates to refrigeration apparatuses, and in particular to thermostatic controls for refrigeration apparatuses.

2. Description of the Prior Art

One form of refrigeration apparatus comprises an air conditioner for cooling room air having an evaporator means arranged to have the room air flowed in heat transfer association therewith to provide the desired cooling of the air. During light load conditions moisture in the air is deposited on the evaporator fins and tubes in the form of frost which, after a period of time, may build up to an undesirable level. A number of control devices have been developed for sensing the frost condition of the evaporator and automatically initiating a defrost operation wherein the frost is melted from the evaporator surfaces. Two excellent air conditioner controls for effecting such defrosting operations are shown in U.S. Pat. No. 3,640,087 of Bobby G. Harrison, et al., and U.S. Pat. No. 3,158,005 of L. J. Jungemann, both owned by the assignee hereof. In the Harrison, et al., patent, frost buildup on the air conditioner evaporator is anticipated by a lowering evaporator temperature which is reflected at the thermostat unit as a result of room air passing over an end portion of the evaporator prior to flow thereof to the thermostat. In the Jungemann patent, a thermostatic control device in the form of a block of resilient material having a preselected limited thermal conductivity is utilized to provide a controlled temperature at the temperature sensing portion of a bellows-type thermostat.

In U.S. Pat. No. 2,947,153 of Leonard W. Atchison, a bellows thermostat is operated by a bulb connected to the bellows by a tube with the bulb being disposed adjacent the fins of the evaporator in the air stream leading to the evaporator so that the bulb may be responsive to frost conditions on the evaporator in controlling the bellows.

SUMMARY OF THE INVENTION

The present invention comprehends an improved temperature-responsive means for controlling the operation of the refrigeration unit of an apparatus, such as a room air conditioner, which utilizes a relatively low cost bimetallic thermostat while yet providing control of the refrigeration unit in response to both the frost condition of the evaporator means and the temperature of the room air.

More specifically, in the illustrated embodiment, the temperature responsive means includes a thermostat including a bimetal actuating element disposed in heat transfer relationship with the air, and thermal conductor means in heat transfer relationship with the evaporator means and the bimetal actuating element whereby the thermostat is responsive to the frost condition of the evaporator means and the temperature of the air.

The thermal conductor means may comprise an element connected to the bimetal actuating element of the thermostat, and in the illustrated embodiment, is connected to a fixed end of the actuating element. The thermal conductor means illustratively may comprise a wire having a connector attached to one end for removable association with a complementary connector secured in heat transfer association with the bimetal actuator element.

The thermal conductor means may be disposed in heat transfer association with the cooling coil of the evaporator. Alternatively, the conductor means may be disposed in heat transfer association with water in the water pan subjacent the cooling coil of the evaporator means. Further alternatively, the thermal conductor means may be disposed in heat transfer association with the water pan.

The thermostat may include a switch actuated by the bimetal element and means may be provided for calibrating the switch for operation thereof at a preselected sensed temperature.

The thermal conductor means may be preselected to provide a selected amount of thermal conductivity as a function of the desired operating temperature of the evaporator coil and the air volume flow of the air conditioner.

Thus, the air conditioner temperature responsive means of the present invention is extremely simple and economical of construction while yet providing a low cost defrost control and permitting a wide range of operating conditions by suitable selection of the thermal conductor means characteristics.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
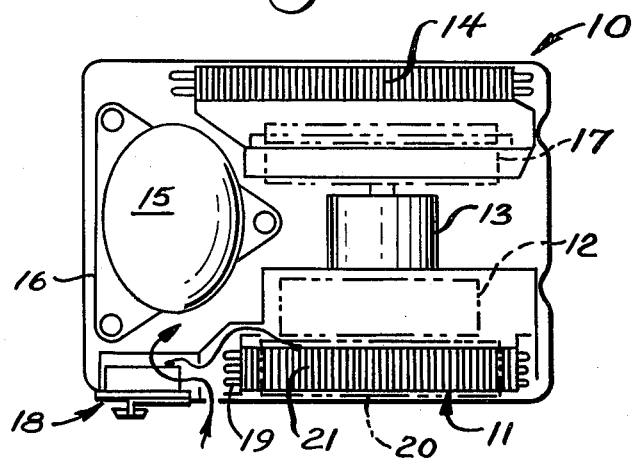
FIG. 1 is a plan view of a refrigeration apparatus having a temperature responsive means embodying the invention.

In the exemplary embodiment of the invention as disclosed in the drawing, a refrigeration apparatus generally designated 10 is shown to comprise an air conditioner for cooling room air. The air conditioner includes a fin and tube evaporator 11. Room air is drawn through the evaporator by a blower 12 driven by an electric motor 13. The air conditioner further includes a conventional condenser 14 for dissipating heat to the outside air. A motor driven compressor 15 is mounted on a suitable base 16 to be disposed in the path of room air drawn by a second blower 17 and directed outwardly through condenser 14. The air moved by blower 17 is further directed over a thermostat device generally designated 18 for controlling the operation of the refrigeration apparatus and more specifically, the operation of compressor 15. In the illustrated embodiment, a portion of the air passed in heat transfer association with the thermostat 18 may flow in heat transfer association with the end turns 19 of evaporator coil 11.

The evaporator means further includes a water pan 20 which is disposed below the cooling coil portion 21 thereof, and in which condensate water may be collected.

In the present invention, thermostat means 18 utilizes a relatively low cost bimetallic thermostat including a bimetal actuating element 22 having a first end 23 fixedly secured to a mounting portion 24 on a dielectric housing 25 of a control switch 26. The distal, cantilevered end 27 of the bimetal actuating element 22 engages an actuating button of the switch 26 to selectively operate the switch as a function of the deflection of the bimetal actuating element.

The temperature responsive control may further include a conventional calibrating device 29 and a manual control knob 30. The calibrating device and end 23 of the bimetal element may be secured to support 24 by suitable fastening means, such as rivet 31.

The invention comprehends the provision of a thermal conductor means generally designated 32 which is in heat transfer relationship with the actuating element 22 and with the evaporator means 11 to provide control of switch 26 in response to the temperature condition of the evaporator means 11 as well as the temperature of the room air flowed thereover.

Figure 2:
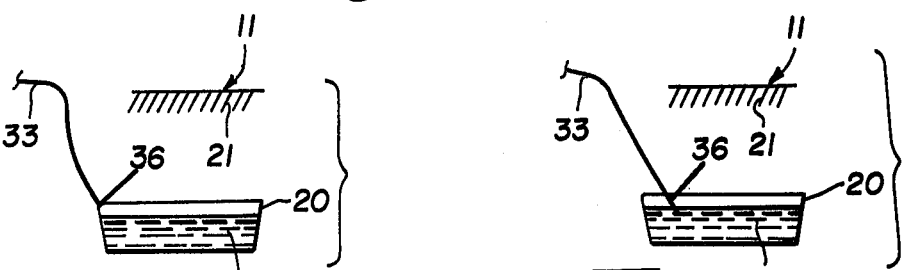
FIG. 2 is a top plan view of the thermostat means.
Figures 3, 4:
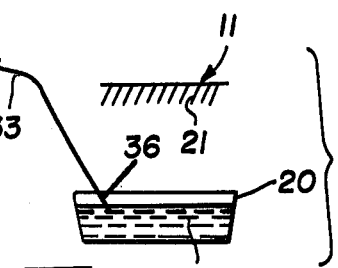
FIG. 3 is a fragmentary view similar to the righthand portion of FIG. 2 illustrating a modified form of the invention.
FIG. 4 is a fragmentary view illustrating another modified form of the invention.

More specifically, thermal conductor means 32 comprises a flexible wire 33 having an electrical connector 34 at one end removably connected to a complementary electrical connector 35 connected to actuating element end 23. The other end 36 of wire 33 is placed in contact selectively with the coil 21 of evaporator means 11, as shown in FIG. 2, with the water collecting pan 20, as shown in FIG. 3, or with the water W in the water collecting pan, as shown in FIG. 4. The temperature of the coil 21 is a function of the latent plus sensible load of the circulated room air. The temperature of the coil 21 increases with increasing load and decreases with decreasing load. The temperature of the collecting pan and water vary directly with the coil temperature. Thus, a preselected wire 33 may be utilized in thermal conductor means 32 to correspond with the required thermal conductivity controlled by the desired evaporator coil temperature and air flow ratios in the particular refrigeration apparatus. Thus, the thermal conductor means may be utilized with a wide range of air conditioner capacity applications by suitable simple substitution of different preselected wires 33.

The plug-in arrangement of connectors 34 and 35 is exemplary only, it being obvious to those skilled in the art that other connecting means may be provided within the scope of the invention.

The heat transfer between actuating element 22 and the evaporator means through the thermal conductor means 32 adjusts the operation of the bimetal strip so as to cause operation of switch 26 when the frost condition of the evaporator reaches a preselected frosted condition. Thus, during a condition when the evaporator means temperature is lower than the air temperature, heat is conducted away from the bimetal activating element 21. Under normal operating conditions of the evaporator, the bimetal actuating element 21 is influenced by the evaporator means temperature, but the room air temperature has the major effect in controlling the operation of switch 26.

Thus, the bimetal thermostat means 18 functions both as an air temperature responsive means and an evaporator frost condition responsive means while yet the thermostat 18 may comprise a low cost bimetal type thermostat avoiding the need for the expensive bellows-type thermostats heretofore utilized in remote control thermostatic installations.

The foregoing disclosure of specific embodiments is illustrative of the broad inventive concepts comprehended by the invention.

Having described the invention, the embodiments of the invention in which an exclusive property or privilege is claimed are defined as follows:

1. In a refrigeration apparatus for cooling air having a refrigeration unit including an evaporator means and means for flowing air to be cooled in heat transfer association with the evaporator means, temperature responsive means for controlling operation of said refrigeration unit comprising: means for flowing air to be cooled in a flow path substantially bypassing said evaporator; a thermostat including a bimetal actuating element disposed in said flow path to be in heat transfer relationship with said air; and thermal conductor means in heat transfer relationship with said evaporator means and said bimetal actuating element whereby the thermostat is responsive to the frost condition of the evaporator means and the temperature of bypassed air.

2. The refrigeration apparatus temperature responsive means of claim 1 wherein said thermal conductor means comprises an element connected to said bimetal actuating element.

3. In a refrigeration apparatus for cooling air having a refrigeration unit including an evaporator means, temperature responsive means for controlling operation of said refrigeration unit comprising: a thermostat including a bimetal actuating element disposed in heat transfer relationship with said air; and thermal conductor means in heat transfer relationship with said evaporator means and said bimetal actuating element whereby the thermostat is responsive to the frost condition of the evaporator means and the temperature of said air, said bimetal actuating element comprising a bimetal strip having a fixed end, and said thermal conductor means comprising an element connected to said fixed end.

4. In a refrigeration apparatus for cooling air having a refrigeration unit including an evaporator means, temperature responsive means for controlling operation of said refrigeration unit comprising: a thermostat including a bimetal actuating element disposed in heat transfer relationship with said air; thermal conductor means in heat transfer relationship with said evaporator means and said bimetal actuating element whereby the thermostat is responsive to the frost condition of the evaporator means and the temperature of said air; an electrical connector secured in heat transfer association with said bimetal actuator element; and a complementary electrical connector secured to said thermal conductor means and separably connected to said first named electrical connector.

5. In a refrigeration apparatus for cooling air having a refrigeration unit including an evaporator means, temperature responsive means for controlling operation of said refrigeration unit comprising: a thermostat including a bimetal actuating element disposed in heat transfer relationship with said air; and thermal conductor means comprising a flexible metal wire in heat transfer relationship with said evaporator means and said bimetal actuating element whereby the thermostat is responsive to the frost condition of the evaporator means and the temperature of said air.

6. In an air conditioner for cooling relatively warm room air having a refrigeration unit including evaporator means and means for flowing the room air in heat exchange relationship to said evaporator to provide relatively cool air, temperature responsive means for controlling operation of said refrigeration unit comprising: means for flowing relatively warm room air in a flow path substantially bypassing said evaporator; a thermostat switch including a bimetal actuating element disposed in said flow path to be in heat transfer relationship with the room air; and thermal conductor means in heat transfer relationship with said evaporator means and said switch actuating element whereby the thermostat is responsive to the condition of the evaporator means and the temperature of the bypassed room air.

7. The air conditioner temperature responsive means of claim 6 wherein said thermal conductor means is connected to said bimetal actuating element.

8. The air conditioner temperature responsive means of claim 6 wherein means are provided for calibrating said switch for operation thereof at a preselected sensed temperature.

9. The air conditioner temperature responsive means of claim 6 wherein said switch means is operated by said bimetal actuating element as a result of a preselected frost condition of said evaporator means.

10. The air conditioner temperature responsive means of claim 6 wherein said thermal conductor means has a thermal conductivity preselected as a function of the desired operating temperature of said evaporator means.

11. In an air conditioner for cooling room air having a refrigeration unit including evaporator means, temperature responsive means for controlling operation of said refrigeration unit comprising: a thermostat switch including a bimetal actuating element disposed in heat transfer relationship with the room air; and thermal conductor means in heat transfer relationship with said evaporator means and said switch actuating element whereby the thermostat is responsive to the condition of the evaporator means and the temperature of the room air, said evaporator means including a cooling coil and a water pan below the coil, said thermal conductor means being in heat transfer association with said water pan of said evaporator means.

12. In an air conditioner for cooling room air having a refrigeration unit including evaporator means, temperature responsive means for controlling operation of said refrigeration unit comprising: a thermostat switch including a bimetal actuating element disposed in heat transfer relationship with the room air; and thermal conductor means in heat transfer relationship with said evaporator means and said switch actuating element whereby the thermostat is responsive to the condition of the evaporator means and the temperature of the room air, said evaporator means including a cooling coil and a water pan below the coil, said thermal conducting means being in heat transfer association with water in said water pan of said evaporator means.

13. In an air conditioner for cooling room air having a refrigeration unit including evaporator means, temperature responsive means for controlling operation of said refrigeration unit comprising: a thermostat switch including a bimetal actuating element disposed in heat transfer relationship with the room air; and thermal conductor means in heat transfer relationship with said evaporator means and said switch actuating element whereby the thermostat is responsive to the condition of the evaporator means and the temperature of the room air, said evaporator means including a cooling coil and a water pan below the coil, said thermal conductor means being in heat transfer association with said cooling coil.

14. In a refrigeration apparatus for cooling air in a space having a refrigeratiotn unit including an evaporator means, temperature responsive means for controlling operation of said refrigeration unit comprising:
 a thermostat including a bimetal actuating element disposed in heat transfer relationship with said air; and
 thermal conductor means in heat transfer relationship with said evaporator means and contacting said bimetal actuating element whereby the thermostat is responsive to the temperature of the evaporator means and the temperature of said air.

15. The refrigeration apparatus temperature responsive means of claim 14 wherein said thermal conductor means comprises a metal wire.

16. In a refrigeration apparatus for cooling air in a space having a refrigeration unit including an evaporator means, temperature responsive means for controlling operation of said refrigeration unit comprising:
 a thermostat including a bimetal acutating element disposed in heat transfer relationship with said air; and
 a flexible metal wire having one portion in heat transfer relationship with said evaporator means and another portion spaced from the said one portion in heat transfer relationship with said bimetal actuating element whereby the thermostat is responsive to the temperature of the evaporator means and the temperature of said air.

* * * * *